(12) United States Patent
Streit et al.

(10) Patent No.: US 7,459,306 B2
(45) Date of Patent: Dec. 2, 2008

(54) DEVICE AND METHOD FOR PROVIDING A HYBRIDIZATION CHAMBER AND FOR INFLUENCING AIR BUBBLES IN THE SAME

(75) Inventors: Wolfgang Streit, Hallein (AT); Gyoergy Wenczel, Seekirchen (AT); Waltraud Lamprecht, Salzburg (AT); Heribert Eglauer, Berchtesgaden (DE)

(73) Assignee: Tecan Trading AG, Maennedorf (CH)

( * ) Notice: Subject to any disclaimer, the term of this patent is extended or adjusted under 35 U.S.C. 154(b) by 570 days.

(21) Appl. No.: 10/909,521

(22) Filed: Aug. 2, 2004

(65) Prior Publication Data

US 2006/0014269 A1 Jan. 19, 2006

(30) Foreign Application Priority Data

Jul. 17, 2004 (DE) .................. 20 2004 011 272 U

(51) Int. Cl.
*C12M 1/34* (2006.01)
*C12M 3/00* (2006.01)
*B01L 3/00* (2006.01)

(52) U.S. Cl. ................. 435/287.5; 422/102; 435/286.7; 435/288.3

(58) Field of Classification Search .............. 435/286.7, 435/287.2, 288.3; 422/102
See application file for complete search history.

(56) References Cited

U.S. PATENT DOCUMENTS

| | | | |
|---|---|---|---|
| 5,766,553 A * | 6/1998 | Staples et al. ................ 422/102 |
| 5,945,334 A * | 8/1999 | Besemer et al. .......... 435/287.2 |
| 5,951,952 A | 9/1999 | O'Beat et al. |
| 6,258,593 B1 * | 7/2001 | Schembri et al. ......... 435/287.2 |
| 6,946,287 B2 * | 9/2005 | Streit et al. .............. 435/287.2 |
| 2003/0013184 A1 * | 1/2003 | Streit et al. .............. 435/287.2 |
| 2006/0003440 A1 * | 1/2006 | Streit et al. .............. 435/287.2 |

FOREIGN PATENT DOCUMENTS

| | | |
|---|---|---|
| EP | 0 785 433 | 7/1997 |
| EP | 1 260 265 | 11/2002 |
| WO | WO 03/106033 | * 12/2003 |

OTHER PUBLICATIONS

Applied Powe Products-Product Line Listing. Sep. 12, 2002 p. 3.*

* cited by examiner

*Primary Examiner*—Walter D Griffin
*Assistant Examiner*—Lydia Edwards
(74) *Attorney, Agent, or Firm*—Notaro & Michalos P.C.

(57) ABSTRACT

A device, appropriate process units and/or systems for providing a gap-shaped hybridization space to hybridize nucleic acid samples, proteins or tissue sections over a slide. Said items of device are able to move in relation to the slide and comprise an annular sealing surface to seal the hybridization space by application to a surface of the slide. Said items of device additionally comprise lines to introduce media to and remove them from the hybridization space. Said items of device furthermore comprise a specimen supply line and preferably an agitation device to move fluids in relation to the samples immobilized on the surface of the slide. The devices according to the invention are characterized in that they limit a hybridization space that features relief structures to conduct and/or block air bubbles on at least one surface of the device and the slide directed at the interior of this hybridization space. According to the method of the invention, air bubbles present in the hybridization space are conducted and/or blocked by these relief structures.

23 Claims, 3 Drawing Sheets

Figure 1A:
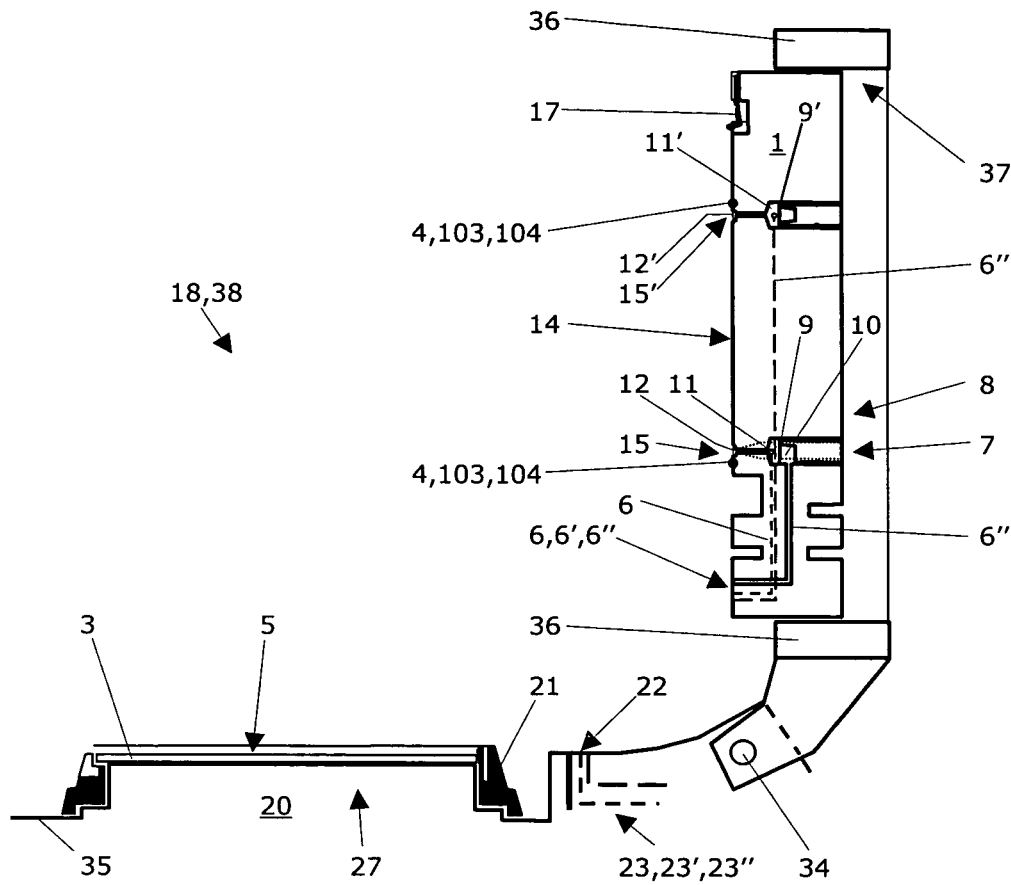

DEVICE AND METHOD FOR PROVIDING A HYBRIDIZATION CHAMBER AND FOR INFLUENCING AIR BUBBLES IN THE SAME

RELATED PATENT APPLICATIONS

This patent application claims priority of the German Utility Patent application No. DE 20 2004 011 272.8 filed on Jul. 17, 2004, the entire disclosure of which is incorporated herein by reference.

RELATED FIELD OF TECHNOLOGY

The present invention relates to a device according to the preamble of independent claim 1 as well as a corresponding process unit according to claim 15 and an automatic system according to the preamble of claim 17 for hybridizing nucleic acid samples, proteins and tissue sections. According to claim 19, the present invention relates to a respective method.

The use of DNA (deoxyribonucleic acid) samples and in particular microarrays of such samples is an important research technique for simultaneously analyzing thousands of genes. This technique comprises the immobilization of DNA samples from many genes on a solid substrate surface, e.g. on a glass slide for a light microscope. Said DNA samples are preferably arranged in an array of sample "spots", i.e. in a two-dimensional grid on the substrate, and the origin of a particular DNA sample can be determined later from its specific position within said array. The technique typically includes contacting the DNA sample array with RNA (ribonucleic acid) specimen suspensions and/or solutions in order to verify specific nucleotide sequences in the DNA samples. Said RNA specimens are often provided with a "tag" or "label", i.e. a molecule that emits fluorescent light of a specific wavelength for example. Immobilized samples may also contain amino acids (e.g. proteins, peptides) or nucleic acids (e.g. cDNA, RNA). Specimens added to said immobilized samples may comprise any molecules or chemical compounds that hybridize with said immobilized samples or combine with them in some other manner.

In good experimental conditions, RNA specimens hybridize or bind with immobilized DNA samples to form hybrid DNA-RNA strands. Differences in hybridization among the DNA samples can be determined for each of the immobilized DNA samples and for specific RNA specimens by measuring the intensity and dependence on wavelength of the fluorescence of each microarray element, thus showing whether the degree of gene expression varies in the DNA samples investigated. Through the use of DNA microarrays it is thus possible to make comprehensive statements about the expression of large numbers of genes and about their expression pattern, although only small amounts of biological material are necessary for the purpose.

PROBLEMS OBSERVED IN PRIOR ART

DNA microarrays have become established as a successful tool, and the apparatus for performing DNA hybridization have continuously improved (cf. U.S. Pat. No. 6,238,910 or US 2003/0013184 A1 or EP 1 260 265 A1 of the present applicant). These documents disclose a device to provide a chamber for hybridizing nucleic acid samples on a slide that is movable in relation to said slide and comprises an annular seal to seal the hybridization chamber by application to a surface of this slide. Furthermore, the disclosed device comprises lines for introducing media to and removing them from the hybridization chamber, as well as a sample feeder.

Improved temperature control and movement of the fluid with the RNA specimens in relation to the DNA samples immobilized on the slide are also disclosed. Nevertheless and with respect to U.S. Pat. No. 6,238,910, reasonably good distribution of the specimen fluid in relation to the samples immobilized on the surface of the slide takes too long, and the consumption of specimen fluid is considered to be too high.

On the one hand it is a frequent occurrence that air bubbles appear in the hybridization chamber when filling fluids or later. On the other hand attempts have been made (cf. U.S. Pat. No. 6,186,659) to purposely use air bubbles as an agitation agent for more thorough mixing of reagents in the hybridization chamber. Generally, however, air bubbles are undesirable in the hybridization medium because they disturb the, in most cases, very thin fluid film over immobilized samples. This can lead to inhomogeneous distribution of reagents in the hybridization medium and thus to corruption of the hybridization results. In the worst case, the larger air bubbles can even displace the hybridization medium from parts of the samples immobilized on the slide.

Numerous methods are known from the present art for hindering spontaneous appearance of air bubbles or their remaining in the chamber. A non-parallel arrangement of the slide and cover defining the hybridization chamber was proposed for example (cf. U.S. Pat. No. 5,922,591), or hybridization media are moved in and out of the chamber during the entire hybridization process. Others mix agents reducing surface tension with the hybridization medium or treat the surfaces of the chamber with hydrophobic chemical compounds.

An arrangement is known from U.S. Pat. No. 6,458,526 by which "half bubbles" projecting into the hybridization chamber are produced from a gas saturated with solvent. Actually these half bubbles are collar-shaped interfaces of gas regions with a defined curvature radius. Said half bubbles are located at defined points of the chamber where they cannot disturb hybridization of the samples. In a compartment separate from the hybridization chamber there is a solvent that is contained in the hybridization medium. A saturated atmosphere is maintained over this solvent that is constantly joined to the gas phases behind the half bubbles.

In this way an atmosphere saturated with the solvent is constantly applied to the collar-shaped interfaces, and thus the partial pressure of the solvent present in the hybridization medium is influenced so that at best existing air bubbles shrink and are eliminated. The disadvantage of this method is that the collar-shaped interfaces have to be created and sustained by special means.

OBJECT AND SUMMARY OF THE PRESENT INVENTION

The purpose of the present invention is to provide an alternative device by which air bubbles in a hybridization chamber can be influenced in a simple manner.

This purpose is achieved by the combined features of independent claim 1 and is characterized in that the device limits a gap-shaped hybridization space that exhibits relief structures for conducting and/or blocking air bubbles on a surface of the device and/or slide pointing towards the inside of this hybridization space.

Another object is to provide a method for influencing air bubbles in a hybridization chamber. This object is achieved by moving and/or trapping air bubbles inside the hybridization space according to independent claim 19.

Advantageous refinements and additional features of the invention result from the dependent claims.

The present invention is based on the consideration that, on the one hand, gas molecules of the ambient air can diffuse into the hybridization chamber so that air bubbles are formed. On the other hand, as a result of changes in the solubility of gases for example, gas bubbles can form spontaneously in the hybridization medium. In conjunction with this invention therefore, all gas bubbles in the hybridization medium—regardless of how they come about in the hybridization chamber—are referred to as "air bubbles".

BRIEF INTRODUCTION OF THE DRAWINGS

Figure 1B:
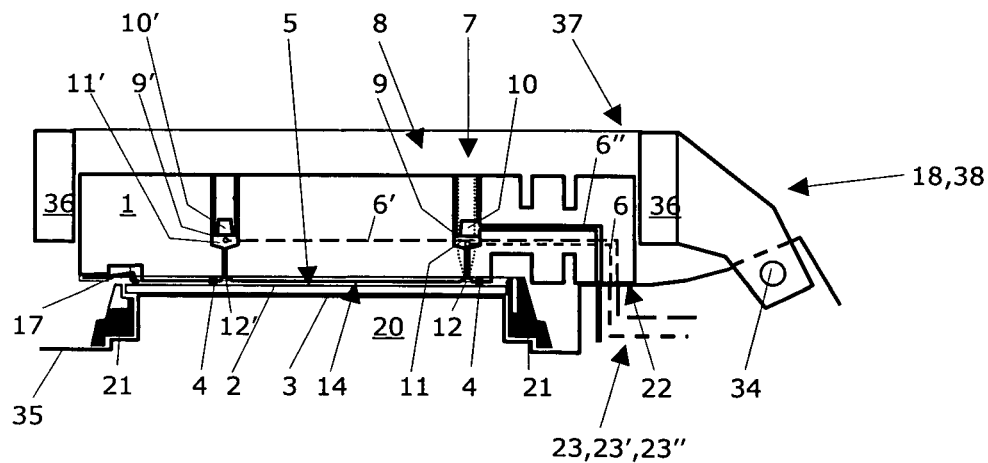
Figure 2A:
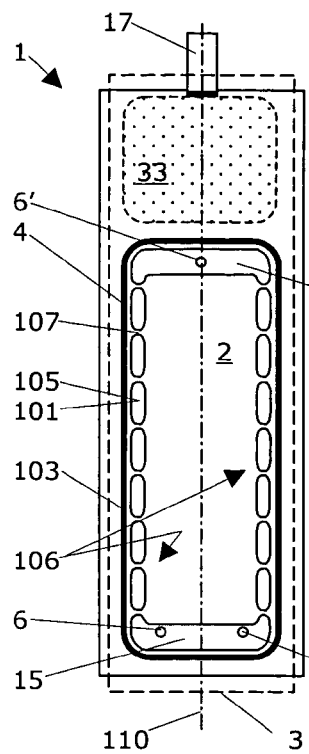
Figure 2B:
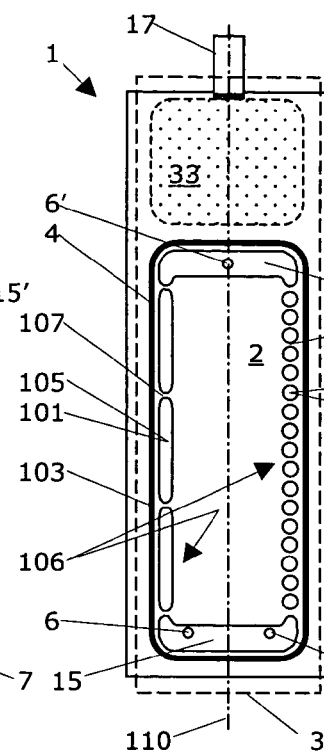
Figure 2C:
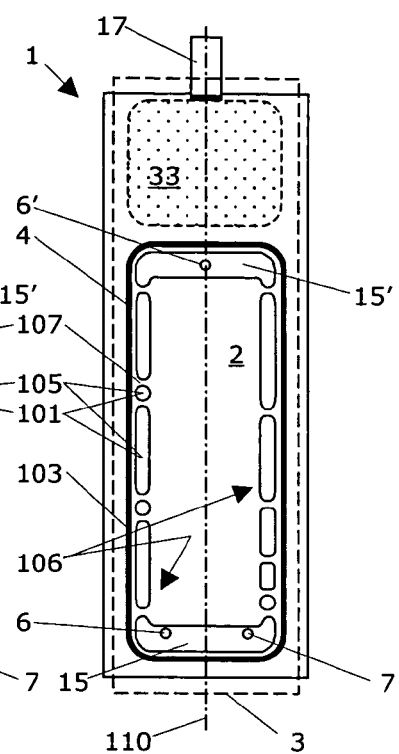
Figure 3A:
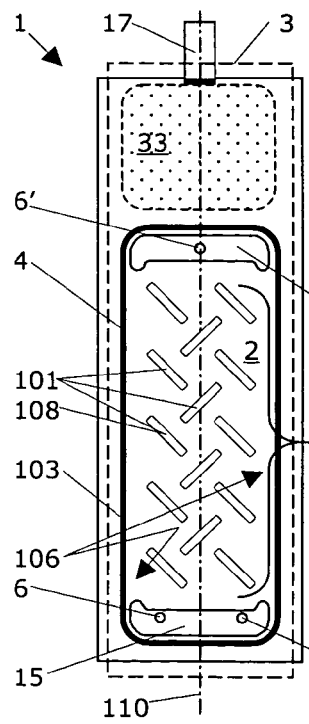
Figure 3B:
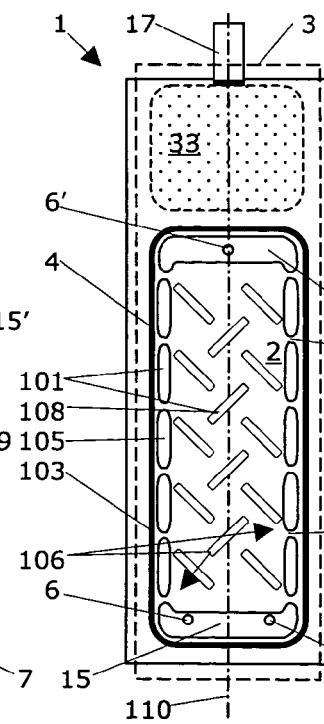
Figure 3C:
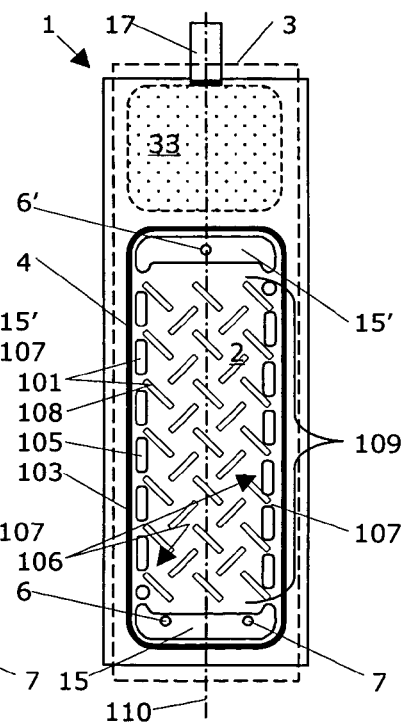
Figure 4A:
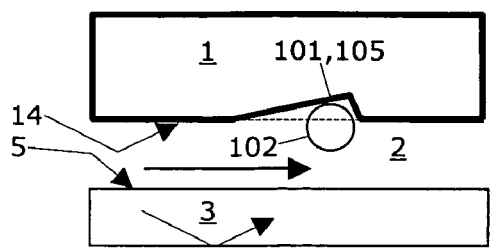
Figure 4B:
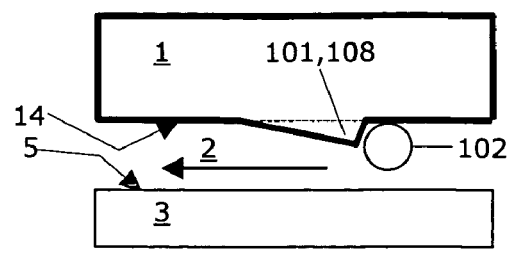
Figure 4C:
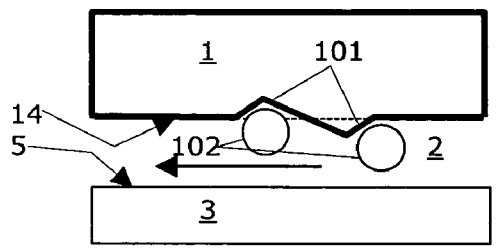
Figure 4D:
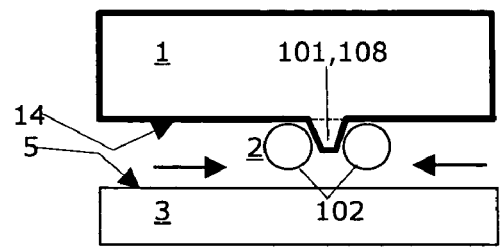
Figure 5:
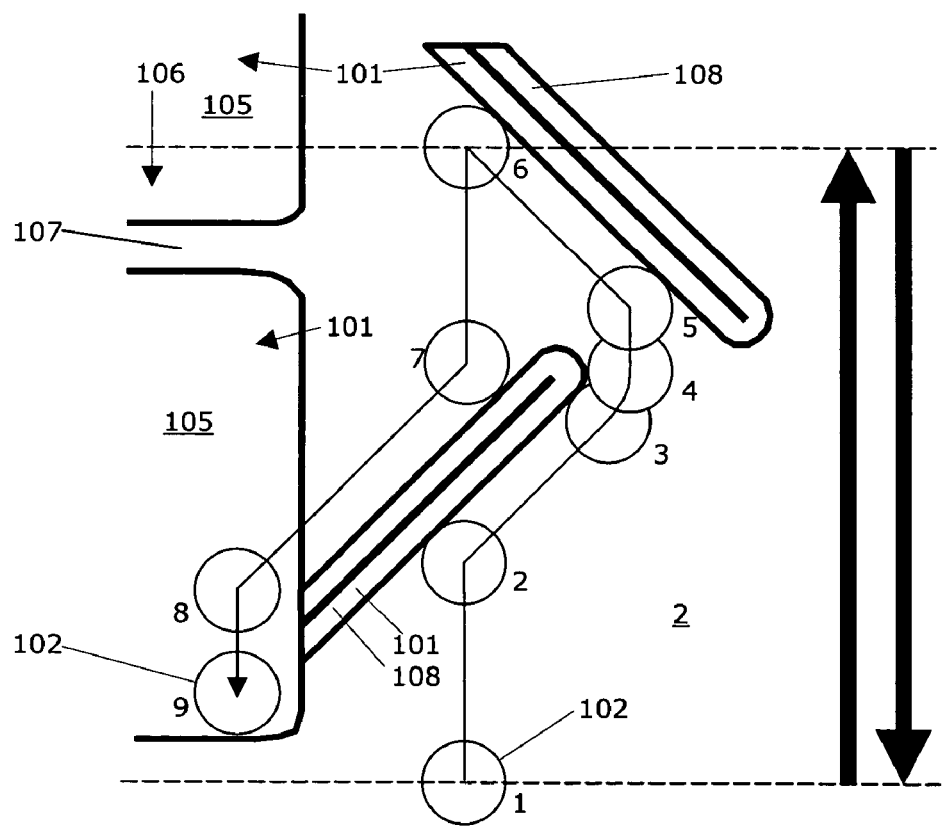

The invention will now be explained in more detail with reference to schematic and exemplary drawings that are not to restrict the scope of the present invention. It is shown in:

FIG. 1A a perpendicular longitudinal section through an arrangement to provide a hybridization chamber with a folded up device;

FIG. 1B a perpendicular longitudinal section through the arrangement of FIG. 1A with a folded down device or closed hybridization chamber;

FIG. 2A a schematic view of a hybridization chamber between a device and a slide on which this device is set, whereby the device exhibits an arrangement of relief structures to block air bubbles in a first variant;

FIG. 2B a schematic view of a hybridization chamber according to FIG. 2A whereby the device exhibits an arrangement of relief structures to block air bubbles according to a second and third variant;

FIG. 2C a schematic view of a hybridization chamber according to FIG. 2A whereby the device exhibits an arrangement of relief structures to block air bubbles according to a fourth and fifth variant;

FIG. 3A a schematic view of a hybridization chamber between a device and a slide on which this device is set, whereby the device exhibits an arrangement of relief structures to conduct air bubbles according to a first variant;

FIG. 3B a schematic view of a hybridization chamber whereby the device exhibits an arrangement of relief structures to conduct and to block air bubbles according to the first variants;

FIG. 3C a schematic view of a hybridization chamber whereby the device exhibits an alternative arrangement of relief structures to conduct and to block air bubbles;

FIG. 4A a perpendicular part section through the arrangement according to FIG. 1B with a folded down device or closed hybridization chamber, whereby the device exhibits a formation of relief structures to conduct air bubbles according to a first variant;

FIG. 4B a perpendicular part section corresponding to FIG. 4A, whereby the device exhibits a formation of relief structures to conduct air bubbles according to a second variant;

FIG. 4C a perpendicular part section corresponding to FIG. 4A, whereby the device exhibits a formation of relief structures to conduct air bubbles according to a third variant;

FIG. 4D a perpendicular part section corresponding to FIG. 4A, whereby the device exhibits a formation of relief structures to conduct air bubbles according to a fourth variant;

FIG. 5 a schematic part view of a hybridization chamber between a device and a slide on which this device is set, whereby the device exhibits an arrangement of relief structures to conduct and to block air bubbles according to the first variants and a formation of said relief structures according to the fourth variant.

DETAILED DESCRIPTION OF THE INVENTION

FIG. 1 shows a perpendicular longitudinal section, corresponding to FIG. 7 of US 2003/0013184 A1 and EP 1 260 265 A1 of the present applicant, through a device 1 for hybridizing nucleic acid samples, proteins and tissue sections. This device 1 can be moved like a cover in relation to a slide 3 (in this case pivotable on an axle 34) so that the hybridization space 2 can be opened (cf. FIG. 1A) and closed (cf. FIG. 1B) by a simple movement. An annular seal or sealing surface 4 serves for sealing the hybridization space 2 by application to a surface 5 of this slide 3. This sealing surface 4 may be an offset surface or step 104 of the cover or the device 1 that lies flat on the surface 5 of the slide 3; a lip seal is a possible alternative. However, an O-ring seal 103 is preferred as the sealing surface 4. The arrangement comprises lines 6,6' for introducing media to and removing them from the hybridization space 2. Such media may be reagents to perform the hybridizing reaction, for example washing liquids or buffer solutions, or inert gases (e.g. nitrogen) to dry the hybridization products on the slides 3 and/or blow out the hybridization chamber 2 and media lines 6,6'. These supply and removal lines 6,6' for hybridizing media will preferably each discharge into an agitation chamber 11,11'. The arrangement comprises furthermore a sealable specimen supply line 7 through which fluids containing RNA or other specimen fluids can be pipetted in by hand. This specimen supply line 7 is preferably sealed by a plastic plug (not shown). Alternatively, an automatic or robotic specimen supply line can be provided, as disclosed in different implementations of US 2003/0013184 A1 and EP 1 260 265 A1 of the present applicant, and to which express reference will be made here.

The items of device 1 are preferably arranged parallel to one another and in a group of four because this arrangement is precisely the dimension for a temperature control plate 20 on which a frame 21 the size of a microplate will fit with four slides 3 arranged parallel to one another. Each of these groups of four is allocated to a temperature control plate 20 connected to a temperature controller. One temperature control plate 20 is formed to hold flat a frame 21 bearing four slides 3. Because the slides 3 are held elastically in the frame 21, and because the temperature control plate 20 is designed so that the frame 21 can be lowered slightly in relation to it, the slides 3 lie direct on the surface of the temperature control plate 20. Each group of four of a process unit 18 comprises a holder 36 with four seats 37, which pivots on an axle 34 and can be locked in relation to a baseplate 35, one device 1 being inserted in each of these seats 37. Each process unit 18 additionally comprises a connection plate 22 for tightly joining the unit lines 23,23',23" of the system 38 to the lines 6,6',6" of the items of device 1. O-rings are preferred as seals for these connections (not shown).

The arrangement preferably comprises a media separating agitation device 8 to move fluids in relation to samples with nucleic acid or amino acid content or tissue sections immobilized on the surface 5 of the slide 3. In the embodiment shown in FIG. 1, the agitation device 8 of the arrangement comprises a membrane 9. Said membrane 9 separates a pressure chamber 10, implemented so that it can be filled with a pressure fluid (gas or liquid) by a pressure line 6", from an agitation chamber 11, which is connected by an agitation line 12 to the hybridization space 2. After the arrangement has reached thermal equilibrium, a certain volume of RNA specimen fluid has been added and the specimen supply line 7 is sealed, preferably air or another gas (it may also be a fluid) is added in surges by the pressure line 6" to the pressure chamber 10 (overpressure version) or extracted from it (underpressure version) so that the membrane 9 deflects in the same rhythm, and accordingly reduces or expands the agitation chamber 11. In this way, in the same rhythm as the overpressure or underpressure and relaxation in the hybridization space 2, the specimen fluid is moved towards one or the other end, where a transverse flow channel 15,15' is preferably located on the surface 14 of the cover or the device 1 directed at the interior of the hybridization space 2.

On the one hand, these transverse flow channels 15,15' simplify the transverse distribution of RNA molecules contained in the specimen solution. Consequently the specimen fluid or washing liquids are distributed homogeneously over the entire volume in the hybridization space 2. On the other hand, these transverse flow channels 15,15' also serve as a fluid reservoir so that the pendulum motion of the specimen solution produced by the agitation means 8 integrated into the device does not result in parts of the hybridization space 2 unintentionally being left dry.

A second agitation chamber 11', also provided with a membrane 9', is preferably connected by a second agitation line 12' to the hybridization space 2. If a pressure surge exerted on the pressure chamber 10 now presses the first membrane 9 into the first agitation chamber 11, this impulse is transmitted by the first agitation line 12 to the specimen fluid in the hybridization space 2. The specimen fluid yields somewhat towards the second agitation line 12' (and may even partly fill it) and increases the pressure in the second agitation chamber 11'. As a result, the second membrane 9' bends upwards and is elastically stretched in the process. As soon as the overpressure in the pressure chamber 10 relaxes, both membranes 9,9' spring back to their neutral position and move the specimen fluid in the hybridization space 2 in the opposite direction. Because of this pendulum motion, the proposed arrangement allows a specimen fluid with a minimal volume (in the region of approx. 100 µl) to be distributed practically homogeneously in less than one minute in the hybridization space 2. Preferably, immediately following the release of pressure in the pressure chamber 10, underpressure is generated in the pressure chamber 10 so that the reverse motion of the specimen fluid in the hybridization space 2 opposite to the preceding pressure surge is further boosted.

While FIG. 1A illustrates an open holder 36, FIG. 1B shows a perpendicular section through a process unit 18 for hybridizing nucleic acid samples, proteins or tissue sections with the holder 36 closed. All four hybridization spaces 2 of this group of four are allocated to a temperature control plate 20 connected to a temperature controller. To ensure that the items of device 1 can be placed plane-parallel to the slides 3, the holder 36 also has a central articulated joint (not shown) that moves parallel to the axle 34. Additional pressure is exerted on the items of device 1 by the holder 36 so that the seals 4 reliably seal the hybridization spaces 2. This can be produced by screws, rocker arms or similar known means (not shown). Each process unit 18 additionally comprises a connection plate 22 for tightly joining the unit lines 23,23',23" to the lines 6,6',6" of the items of device 1. O-rings are preferred as seals for these connections (not shown).

FIGS. 2 and 3 show schematic views of the closed arrangement of FIG. 1B seen from below. The gap-shaped hybridization chamber 2 is of defined volume between a device 1 and a slide 3 on which this device 1 is set. The O-ring seal 103 marks the lateral limits of the hybridization space 2, which preferably has a transverse flow channel 15,15' at each end, in the form of depressions in the surface 14 of the cover or the device 1. The slide 3 (here a glass slide for light microscopy) and its optional grip and/or barcode field 33 are indicated by dashes. Clearly visible is a pressure spring 17 that presses on the grip field 33 of the slide 3. Multiple pressure springs may also be provided (not shown). In addition, centering springs can be arranged (not shown)—preferably on the side edges of the device 1—to center slides with special formats on the device 1 and ensure maximum utilization of the slide surface. When the hybridization space 2 is opened, this pressure spring 17 eases the automatic separation of the slide 3 from the cover or the device 1. Also visible are the openings of the inlet line 6 and the outlet line 6' and the specimen supply line 7 discharging into one of the two transverse flow channels 15,15'.

FIG. 2A shows a device 1 with an arrangement of relief structures 101 to block air bubbles 102 according to a first variant. Here, these relief structures 101 take the form of depressions 105 arranged in border regions 106 of the hybridization space 2 along one or more parts of the sealing surface 4. As shown, no lines 6,6',7 discharge into these depressions 105. In this preferred first variant there are several depressions arranged in a row left and right of the hybridization chamber 2, whereby these rows extend over the entire border region 106 between the two transverse flow channels 15,15' at the ends. The depressions 105 are in the immediate vicinity of the O-ring 103, they are all of the same length, and separated by narrow bars 107 so that the air bubbles 102 are trapped in the particular depression 105 and thus unable to connect to the slide 3 and prevent or hinder hybridization of the samples below. Furthermore, air bubbles 102 trapped in this way in the depressions 105 cannot distribute over the hybridization space 2.

FIG. 2B shows an arrangement of relief structures 101 to block air bubbles 102 according to a second and third variant. The depressions 105 are in the immediate vicinity of the O-ring 103, they are all of the same length, and separated by narrow bars 107 so that the air bubbles 102 are trapped in the particular depression 105. In the second variant (left) there are only a few long depressions 105; there could even be just a single depression arranged on each side of the hybridization chamber 2 (not shown). What is important is that a bar 107 separates these depressions 105 from the transverse flow channels 15,15'. In the third variant (right) there are multiple short (e.g. round) depressions 105. The advantage here is that of creating very many individual compartments to block air bubbles 102.

FIG. 2C shows an arrangement of relief structures 101 to block air bubbles 102 according to a fourth and fifth variant. The depressions 105 are in the immediate vicinity of the O-ring 103, they differ in length, and are separated by narrow bars 107 so that the air bubbles 102 are trapped in the particular depression 105. In the fourth variant (left) there are only a few long depressions 105 between which short (e.g. round) depressions can be arranged. In the fifth variant (right) there are a number of depressions 105 increasing in length. The advantage of the arrangements shown here is that compartments are created to block air bubbles 102 that are individually distributed as a function of certain process parameters or chamber properties. For example, depressions can be arranged to match gradients demonstrated by experience (in the hybridization medium and/or in the occurrence of air bubbles).

The arrangements shown of relief structures 101 in the form of depressions 105 are suitable in particular for blocking air bubbles 102 occurring by diffusion through the O-ring 103, and in the immediate vicinity of where they occur. In addition to variation of the number and length of the relief structures 101 in the form of depressions 105 to block air bubbles 102, variation of the width and/or depth of said depressions 105 is also part of the present invention. Channel traps for air bubbles can also be provided along the side O-rings. Said channel traps (not shown) take the form of a single depression that is simply separated from the two transverse flow channels 15,15' by a thin bar. It should be mentioned that the depressions 105 of the invention can also be used in hybridization chambers 2 that have no agitation device.

FIG. 3A shows an arrangement of relief structures 101 to conduct air bubbles 102 according to a first variant. Here these relief structures 101 take the form of elevations 108 to conduct air bubbles 102 and are essentially distributed over the entire hybridization space 2. The elevations 108 are preferably arranged regularly and in an entwined orthogonal pattern 109. Especially preferred is an entwined orthogonal pattern 109 that is arranged offset by 45° from a flow axis 110. Deviations from the orthogonal arrangement are possible so that, through a smaller angle to the direction of flow than 45° (steeper pitch), displacement becomes easier. On the other hand, a greater distance in displacement can be achieved by selecting angles of more than 45° to the direction of flow (flatter pitch).

FIG. 3B shows an arrangement of relief structures 101 to conduct and to block air bubbles 102. The blocking relief structures 101 take the form of depressions 105 and are arranged in boundary regions 106 of the hybridization space 2 along one or more parts of the O-ring 103 (cf. FIG. 2A). The conducting relief structures 101 take the form of elevations 108 to conduct air bubbles 102 and are essentially distributed over the entire hybridization space 2 (cf. FIG. 3A). The combination of blocking and conducting relief structures 101 fuses the positive effects, already described, of these relief structures. The arrangement and the size of all relief structures 101 used to influence air bubbles 102 are preferably matched to one another. Important criteria for such matching are the volume of the hybridization chamber (preferably approx. 60 µl), the stroke of the agitation device (preferably approx. 5 µl), the length of the hybridization chamber (preferably approx. 50 mm) and the pendulum travel, resulting from the agitation, of the hybridizing media over the immobilized samples (preferably approx. 5 mm). It is also desirable that the frequency of the agitation cycles be adjustable. This means that agitation times of different length alternate with times without agitation of different length. However, the agitation times are preferably selected long enough to produce a large number of agitation motions per minute and thus multiple, thorough mixing of the chamber volume. Mixing experiments with coloring materials have shown that there is practically 100% mixing after a few minutes.

FIG. 3C shows an alternative arrangement of relief structures 101 to conduct and to block air bubbles 102. The blocking relief structures 101 take the form of smaller depressions 105 (cf. FIG. 3B). The conducting relief structures 101 are in the form of finer elevations 108, distributed over a tighter mesh, to conduct air bubbles 102 (cf. FIG. 3B).

FIGS. 4 show perpendicular part sections through an arrangement according to FIG. 1B with a folded down device 1 or closed hybridization chamber 2. Arrows indicate the flow direction of the specimen fluid referred to the samples immobilized on the slide 3. This motion of the specimen fluid, interacting with the shown relief structures 101, produces displacement of the air bubbles 102 from the actual flow direction or flow axis 110.

FIG. 4A shows a formation of relief structures 101 to conduct air bubbles 102 according to a first variant. This relief structure is a depression 105 exhibiting a flat and a steep edge. The edges of the depression 105 each form a line of intersection with the surface 14 of the device 1. With a constant difference in height and edge inclination of the depression 105, these lines of intersection are parallel to one another (cf. FIG. 5). With increasing difference in height and constant edge inclination of the depression 105, these lines of intersection will diverge; in this way a fish-scale-like relief can be produced on the surface 14 of the device 1, for example. The inclination angle of the steep edge and the angle between the flow axis 110 and the line of intersection between the steep edge and the surface 14 of the device 1 together determine the influence on an air bubble 102 that is washed against this steep edge. These two angles are selected by the invention so that the flow resistance of the air bubble 102 to the steep edge in the direction of the flow axis 110 is greater than in the direction of the relief structure 101. Thus the air bubble 102 is displaced from the general flow direction. This displacement is additionally supported by the local micro flow deflected in the same direction by the relief structure 101. These micro flows appear on all relief structures 101 arranged at an angle to the flow axis 110 and also support more effective mixing of the specimen fluid.

Another preferred variant (not shown) comprises the formation of conducting depressions 105 that start at one end with the depressions 105 to block air bubbles 102 and extend to beyond the middle of the hybridization space 2 (marked by the flow axis 110 in FIGS. 2 and 3). These conducting depressions 105 are likewise preferably oriented at an angle of 45° to the flow axis 110 and alternate starting from the left or right side of the hybridization chamber 2 at an angle of 90° to one another. These conducting depressions 105 can be constant in depth or be pointed after the middle of the hybridization space 2.

FIG. 4B shows a formation of relief structures 101 to conduct air bubbles 102 according to a second variant. This relief structure is an elevation 108 exhibiting a flat and a steep edge. FIG. 4C shows a formation of relief structures 101 to conduct air bubbles 102 according to a third variant. This relief structure is partly a depression 105 and partly an elevation 108, exhibiting two steep and one flat edges. All remarks relating to FIG. 4A apply analogously to FIGS. 4B and 4C.

FIG. 4D shows a formation of relief structures 101 to conduct air bubbles 102 according to a fourth variant. This relief structure is an elevation 108 exhibiting two steep edges and a flat (elevated) surface. All remarks relating to FIG. 4A apply analogously here too. A further variant (not shown) comprises a formation of relief structures 101 to conduct air bubbles 102 where this relief structure 101 is in the form of a depression 105 with two steep edges and a flat (depressed) surface. Common to both variants is that the lines of intersection of the steep edges can be parallel to the surface 14 of the device 1 so that the difference in height of these relief structures 101 is constant (shown). Also common to both variants is that the lines of intersection of the steep edges can diverge from the surface 14 of the device 1, and that the difference in height of these relief structures 101 is nevertheless constant (not shown).

Differing from the relief shapes shown in FIGS. 4, relief structures 101 as elevations 108 with a collar-shaped cross-section are also preferred (not shown). With such elevations 108, air bubbles 102 with a diameter of maximally about 50 µm will, with greater probability, only make one point contact. Thus, with relatively little agitation, the air bubbles do not remain caught on the elevations 108 and are also washed on into the transverse flow channels 15,15'. If the air bubbles 102 do not remain trapped en route in depressions 105, they are collected in the transverse flow channels 15,15'.

The arrangement of depressions 105 is in most cases preferred to elevations 108 because depressions always mean an increase in the height of the preferably approx. 60 to 70 μm high hybridization chamber 2. This reduces the risk of an air bubble compromising the hybridization result of a sample. Especially preferred is an at least approximated volume balance of depressions 105 and elevations 108 so that a defined volume can be maintained for the gap between the device 1 and the slide 3 and thus a defined volume for the hybridization chamber 2.

The blocking of air bubbles 102 with device 1 as proposed by the invention, exhibiting relief structures 101 according to one of the examples illustrated in FIG. 2, works in systems with or without an agitation device to move the specimen solution compared to the immobilized samples. However, if such a system 38 for hybridizing nucleic acid samples, proteins or tissue sections is fitted with an agitation device (e.g., as shown in and explained for FIG. 1), this produces a pendulum motion of the specimen fluid in relation to the samples immobilized on the slide 3. In such a system—as disclosed in US 2003/0013184 A1 and EP 1 260 265 A1 of the present applicant—fitted with items of device 1 according to the invention, spontaneously appearing or already existent (introduced) air bubbles 102 in the hybridization space 2 are moved backwards and forwards and are displaced by conducting relief structures 101 into boundary regions 106 of the hybridization space 2, as explained in what follows. Express reference is made to the published patent applications US 2003/0013184 A1 and EP 1 260 265 A1 of the present applicant.

FIG. 5 is a schematic part view of a hybridization chamber 2 between a device 1 and a slide 3 on which this device 1 is set. The device 1 exhibits an arrangement of relief structures 101 to conduct and to block air bubbles 102 according to the first variants (cf. FIG. 3B) and a formation of these relief structures 101 as elevations 108 according to the fourth variant (cf. FIG. 4D). The average distance to be covered by the sample molecules during a pendulum motion generated by an agitation device is marked by two arrows pointing in opposite directions. This distance can also be substantially longer but not much shorter than shown in the schematic presentation. Preferred is a distance of two consecutive, in the direction of agitation, identically oriented relief structures of approx. ⅔ of the pendulum motion or approx. 4 mm. The typical path of an air bubble 102 begins at any position (1) in the hybridization space 2. This air bubble 102 with a diameter of maximally about 50 μm (for a chamber height or gap height of preferably 30 to 200 μm) is caught by the flow (upwards in the drawing) and moved on an essentially straight line until it strikes a first relief structure 101 in the form of an elevation 108 (2). Because the resistance for the air bubble 102 to deflect (here: 45° upwards to the right) is substantially smaller than for it to stay where it is, it is drawn by the flow to the end of the relief structure 101 (3,4). Then the air bubble 102 continues to move in a straight line until it comes up against a second relief structure 101 (5), by which it is again deflected (here: 45° upwards to the left) and stops (6) when the flow ceases. Now the flow starts in the opposite direction and draws the air bubble 102 until it comes up against the rear of the first relief structure 101 (7), is again deflected (here: 45° downwards to the left) and enters into the relief structure 101 (8) in the form of a depression 105. The air bubble 102 is then trapped in this depression 105 and can only follow the pendulum flow within these tight limits (9). If other air bubbles are already blocked in the depression 105, an aggregation or even a fusing of the air bubbles can be observed. These two processes add to the probability that none of the air bubbles can escape from the depression 105.

The relief structures 101 (elevations and depressions) proposed by the invention on the cover or the device 1 preferably exhibit a difference in height from the otherwise plane surface 14 of the cover or the device 1 of maximally ⅓ of the preferred gap height of 30 to 200 μm. Especially preferred are differences in height of 30 μm for depressions and 20 μm for elevations. These relief structures 101 can be formed in the device 1 during the production process (e.g. injection molding, machining of bar material). Depressions can also be formed afterwards (e.g. by milling). Elevations too can be attached subsequent to the actual production process of the device 1 (e.g. by adhesion or deposition of resins). This can be done by means of a template, for example, or semi-finished products on adhesive strips.

Slides 3 can also be provided with relief structures 101, depressions 105 and/or elevations 108. Relief structures 101 are preferably arranged on slides 3 according to the expected sample distributions on their surface 5. Square, so called low-density arrays can be separated by channel-like depressions for example.

Slides 3 may also comprise a seal that is part of the slide or arranged on it. Such seals can be produced in a dual-component injection molding process with slides of plastic for example. The spraying of such, preferably soft, seals 4 onto glass slides is likewise possible. Complementary to that, the device 1 or the cover closing the hybridization space 2 can have a hard seal 4 to maintain the defined gap width or height of the hybridization space. It is also conceivable to use—likewise produced by a dual-component injection molding process for example—compound seals with a soft component (sealing) and a hard component (defining the gap height). The material of the device 1 (preferably polysulfone) will tend to be of secondary importance.

Each ring-shaped arrangement or ring with a sealing function in the context of the present invention is referred to as an O-ring. Said O-ring may optionally have a round, elliptical or polygonal cross-section or be in the form of a sealing lip for example.

What is essential is that, at least in the region of the hybridization space 2, the surface 5 of the slide 3 be arranged on average plane-parallel to the surface 14 of the device 1. Basically however, the hybridization space 2 must not necessarily have an approximately rectangular base area as shown in FIGS. 2 and 3. In hybridization spaces differing from the rectangular base area with a round form for example, the depressions 105 can be arranged along the seal 4. Elevations 108 too, as proposed by the present invention, can be arranged in a tangential agitation direction for example. Furthermore, the device 1 for influencing air bubbles must not necessarily be transparent or exhibit transparent parts.

For the event that particularly many but very small bubbles regularly appear in a hybridization medium whose diameter is substantially smaller than the space between the device 1 and the slide 3, said air bubbles can be blocked at the point of their appearance by a grid pattern inscribed in the surface 14 of the device 1. This prevents the small air bubbles from aggregating or fusing into larger formations that could irritate the hybridizing reactions.

The reference numbers refer to identical features in each case, even if not all features are expressly stated for each figure. Any variations and combinations of the variants disclosed here are within the scope of the present invention. In particular, the device 1, the slide 3 or both of them may exhibit relief structures 101, whether depressions 105 and/or elevations 108.

What is claimed is:

1. A process unit for providing a gap-shaped hybridization space to hybridize nucleic acid samples, proteins or tissue sections on a slide, comprising:
   a) at least one slide;
   b) at least one device closing the hybridization space and being able to move in relation to the at least one slide;
   c) an annular sealing surface to seal the hybridization space by application to a surface of the at least one slide;
   d) lines to introduce media to and remove them from the hybridization space; and
   e) a specimen supply line,
   wherein the device and each one of the slides limit a hybridization space that has relief structures in the form of depressions to block air bubbles, wherein the relief structures are located on a surface of at least one of the device and the slide, and wherein the depressions form line-less bubble traps, arranged entirely within the hybridization space.

2. The process unit of claim 1, wherein the annular sealing surface is in the form of a ring with a sealing function or a step.

3. The process unit of claim 2, wherein the ring is in the form of an 0-ring or a sealing lip.

4. The process unit of claim 2, wherein the step is formed in the surface of the device or in the surface of the slide.

5. The process unit of claim 1, which has a transverse flow channel on its surface directed at the interior of the hybridization space at each of the two opposite ends of said hybridization space.

6. The process unit of claim 1, wherein the relief structures in the form of depressions are arranged in boundary regions of the hybridization space and along at least one part of the sealing surface.

7. The process unit of claim 5, wherein the depressions are arranged left and right of the hybridization space along the sealing surface and separated at least by bars from the transverse flow channels.

8. The process unit of claim 1, which comprises an agitation device to move fluids in relation to samples immobilized on the surface of the slide.

9. The process unit of claim 1, wherein the hybridization space has relief structures in the form of elevations to conduct air bubbles, wherein the relief structures are located on a surface of at least one of the device or the slide, and wherein the elevation are arranged entirely within and essentially distributed over the entire hybridization space.

10. The process unit of claim 9, wherein the elevations are arranged regularly and in an entwined pattern.

11. The process unit of claim 10, wherein the entwined pattern is arranged orthogonally and at an angle of 45° to a flow axis.

12. The process unit of claim 9, wherein the depressions and elevations are matched to one another in their size and distribution and merge at least in part.

13. The process unit of claim 8, wherein the agitation device comprises at least one membrane that separates a pressure chamber, which can be filled with a pressure fluid by a line, from an agitation space, which is connected to the hybridization space by an agitation line.

14. The process unit according to claim 1, comprising at least one temperature control plate connected to a temperature controller.

15. The process unit of claim 14, wherein the devices are arranged in groups of four, whereby the temperature control plate of each group of four is formed to hold a frame bearing four slides.

16. A system for hybridizing nucleic acid samples, proteins or tissue sections, which comprises at least one process unit according to claim 1, a central controller, a monitor and receptacles, communicating with the unit lines and the lines, to hold reagents and/or collect waste.

17. The system of claim 16, which comprises an automatic pipetting device by which specimens can be put into specimen vessels of the items of device, whereby said automatic pipetting device can be driven or controlled by said central controller.

18. Method of influencing air bubbles in a process unit for providing a gap-shaped hybridization space to hybridize nucleic acid samples, proteins or tissue sections on a slide, the process unit comprising:
   a) at least one slide;
   b) at least one device closing the hybridization space and being able to move in relation to the at least one slide;
   c) an annular sealing surface to seal the hybridization space by application to a surface of the at least one slide;
   d) lines to introduce media to and remove them from the hybridization space; and
   e) a specimen supply line,
   wherein air bubbles present in the hybridization space are blocked by relief structures in the form of depressions, said relief structures being located on a surface of at least one of the device and the slide, the depressions forming line-less bubble traps arranged entirely within the hybridization space.

19. The method of claim 18, wherein the air bubbles are moved by an agitation device to move fluids in relation to samples immobilized on the surface of the slide, and wherein said air bubbles are trapped in relief structures in the form of depressions.

20. The method of claim 18, wherein the air bubbles are moved by an agitation device to move fluids in relation to samples immobilized on the surface of the slide, and wherein said air bubbles are conducted by relief structures in the form of elevations and are trapped in relief structures in the form of depressions.

21. A system for hybridizing nucleic acid samples, proteins or tissue sections, which comprises at least one process unit according to claim 14, a central controller, a monitor and receptacles, communicating with the unit lines and the lines, to hold reagents and/or collect waste.

22. The system of claim 21, wherein the devices are arranged in groups of four, whereby the temperature control plate of each group of four is formed to hold a frame bearing four slides.

23. The system of claim 16, wherein the devices are arranged in groups of four.

* * * * *